United States Patent [19]

Ferretti et al.

[11] Patent Number: 4,736,329

[45] Date of Patent: * Apr. 5, 1988

[54] METHOD AND SYSTEM FOR MEASUREMENT OF LIQUID LEVEL IN A TANK

[75] Inventors: Michael D. Ferretti, Nazareth; Brian L. Gabel, Northampton; James A. Horton, Bethlehem; Thomas S. Weiss, Sr., Emmaus, all of Pa.

[73] Assignee: Air Products and Chemicals, Inc., Allentown, Pa.

[*] Notice: The portion of the term of this patent subsequent to Jul. 22, 2003 has been disclaimed.

[21] Appl. No.: 853,825

[22] Filed: Jun. 16, 1986

Related U.S. Application Data

[63] Continuation of Ser. No. 664,817, Oct. 25, 1984, Pat. No. 4,602,344.

[51] Int. Cl.$^4$ .......................... G01F 23/00; F15B 5/00
[52] U.S. Cl. .................... 364/509; 73/291; 364/575
[58] Field of Search ............ 73/304 R, 301, 299, 73/291; 364/509, 575, 581

[56] References Cited

U.S. PATENT DOCUMENTS

| | | | |
|---|---|---|---|
| Re. 29,868 | 12/1978 | Schontzler et al. | 364/510 |
| 3,371,534 | 3/1968 | Akeley | 73/299 |
| 3,640,134 | 2/1972 | Hop | 72/299 |
| 3,720,818 | 3/1973 | Spragg et al. | 235/151.32 |
| 3,874,238 | 4/1975 | Compton et al. | 73/339 |
| 4,020,690 | 5/1977 | Samuels et al. | 73/299 |
| 4,059,016 | 11/1977 | Kitzinger et al. | 73/304 |
| 4,201,240 | 5/1980 | Case | 137/392 |
| 4,217,777 | 8/1980 | Newman | 73/198 |
| 4,250,750 | 2/1981 | Martin et al. | 73/308 |
| 4,252,097 | 2/1981 | Hartford | 123/381 |
| 4,296,472 | 10/1981 | Sarkis | 364/509 |
| 4,313,114 | 1/1982 | Lee et al. | 340/870 |
| 4,317,178 | 2/1982 | Head | 364/510 |
| 4,332,166 | 6/1982 | Lawford | 73/299 |
| 4,353,245 | 10/1982 | Nicolai | 73/49.2 |
| 4,355,363 | 10/1982 | Colby et al. | 364/509 |
| 4,361,037 | 11/1982 | Hauschild et al. | 73/295 |
| 4,386,409 | 5/1983 | Igarashi et al. | 364/442 |
| 4,387,434 | 6/1983 | Moncreif et al. | 364/509 |
| 4,388,691 | 6/1983 | Nuspi | 364/510 |
| 4,400,779 | 8/1983 | Kosuge et al. | 364/442 |
| 4,402,048 | 8/1983 | Tsuchida et al. | 364/442 |
| 4,434,657 | 3/1984 | Matsumura et al. | 73/304 |
| 4,437,157 | 3/1984 | Kato | 364/442 |
| 4,441,157 | 4/1984 | Gerchman et al. | 364/551 |
| 4,471,656 | 9/1984 | Sanders et al. | 73/438 |
| 4,602,344 | 7/1986 | Ferretti et al. | 73/291 |
| 4,611,287 | 9/1986 | Kobayashi et al. | 364/575 X |
| 4,612,624 | 9/1986 | Tsuji | 364/581 |
| 4,625,284 | 11/1986 | Suzuki | 364/509 |

FOREIGN PATENT DOCUMENTS 1029184 7/1983 U.S.S.R. .

Primary Examiner—Daniel M. Yasich
Attorney, Agent, or Firm—James C. Simmons; William F. Marsh

[57] ABSTRACT

The computer based remote tank telemetry system uses a method for updating a prior collected average level of substance in a tank. It continuously determines values of differential pressure within the tank and in accordance with the values of differential pressure determines the instantaneous level of substance within the tank. A prior collected average level is stored and is compared with each of the instantaneous values of level thus obtained. On the basis of this comparison a relative weighing factor is determined which weighs the relative contribution of the collected and instantaneous values in determining a new collected value. The new collected average is compared against a predetermined setpoint to determine whether the level of substance in the tank is too low. The results of this comparison can be displayed locally, and using a modem, communicated to a remote display. The method for determining the relative weighing factor has three tiers. The selection of the required tier is done in accordance with the levels compared.

10 Claims, 2 Drawing Sheets

METHOD AND SYSTEM FOR MEASUREMENT OF LIQUID LEVEL IN A TANK This application is a continuation of application Ser. No. 664,817, filed Oct. 25, 1984, now U.S. Pat. No. 4,602,344.

BACKGROUND OF THE INVENTION

A. Field of the Invention

This invention relates to the replenishing of substance within liquid storage tanks and, in particular, replenishing such tanks when the substance in the tanks produces erratic pressure readings when drawn or replenished.

B. Background Art

Many liquid products are delivered in bulk to a user's site where they are held in a storage tank, from which either intermittent or continuous withdrawal may occur. Examples include liquid fuels such as domestic heating oil, liquid chemicals employed in manufacturing processes, and liquified gases such as oxygen or nitrogen.

For some applications, it is important that the tank never run dry. For example, liquified nitrogen is a source of inert nitrogen gas for submerging various industrial processes and operations. If the supply of nitrogen runs out during a process run, an entire production lot may be destroyed. Nitrogen gas is also used to purge storage tanks from which flammable liquids are being withdrawn to avoid the entrance of air and the subsequent formation of explosive mixtures. Exhaustion of nitrogen during this process can result in an explosion.

Two methods were commonly employed to insure that liquid was available at all times in these storage tanks. The first method was to anticipate from past experience the rate of withdrawal of liquid from the tank, and to extrapolate in order to estimate the time at which replenishment was needed. This approach assumed that usage patterns were similar to prior usage patterns. If depletion were more rapid than anticipated because of increased use or leakage, the tank could empty before the normal replenishment time was reached. Likewise, if usage were unexpectedly curtailed, an unnecessary trip by the supplier's delivery vehicle resulted in the addition of only a small amount to top off the tank.

The second approach was for the user to periodically measure the amount of substance remaining in the tank, and notify the supplier when a delivery was required. This method depended entirely upon the diligence of the user in adhering to a schedule of tank readings and the user's ability to recognize the necessity of a request for a delivery.

Furthermore, it was not possible, in the case of cryogenic liquids, for the user to obtain a direct measurement of the substance level. Typically, the user had available only pressure readings from the tank from which to determine the substance level. These pressure readings included (1) the pressure in the vapor space at the top of the tank and (2) the differential pressure which is the difference between the vapor space pressure and the pressure at the bottom of the tank, called the substance weight pressure.

The relationship between these two variables, the vapor space pressure and the differential pressure, and the actual substance volume is a complex high order polynomial. Solution charts for this polynomial have been prepared. Thus, to get an accurate measurement of substance volume, the user was required to locate the correct chart entry depending on the pressure readings. These charts were different for different substances and for different tanks.

Further complicating these problems was the fact that, when substance was supplied to a cryogenic tank the vapor space pressure readings became erratic. This happens when the the pump forces new substance into the tank which is at a different temperature than that in the tank. The temperature differential results in vaporization of liquid which in turn causes turbulence in the tank and unpredictable fluctuations. Thus, for practical purposes, it is extremely difficult to determine substance level under conditions of replenishing.

For purposes of considering the patentability of the invention disclosed and claimed, a brief patentability search was conducted. The patents identified to be of possible interest in that search were:

| Patent No. | Inventor |
|---|---|
| Re. 19,868 | Schontzler et al. |
| 4,201,240 | Case |
| 4,250,750 | Martinec et al. |
| 4,252,097 | Hartford et al. |
| 4,296,472 | Sarkis |
| 4,313,114 | Lee et al. |
| 4,353,245 | Nicolai |
| 4,361,037 | Hauschild et al. |
| 4,402,048 | Tsuchida et al. |
| 4,434,657 | Matsumura et al. |
| 4,437,162 | Kato |
| 4,441,157 | Gerchman et al. |

It is therefore an object of this invention to provide reliable substance level monitoring in cryogenic tanks during drawing and replenishing of substance.

It is a further object of this invention to provide constant on-line monitoring of substance level based upon pressure and differential pressure.

It is a further object of the present invention to provide remote telemetry monitoring of substance level of cryogenic tanks to allow determination of when a delivery of more substance is required.

SUMMARY

A system for measuring liquid level in a tank updates a prior collected average level of substance in the tank. It continuously determines values of differential pressure within the tank and in accordance with the values of differential pressure, calculates the instantaneous level of substance within the tank. A prior collected average level is stored and is compared with each of the instantaneous values of level thus obtained. On the basis of this comparison a relative weighting factor is determined which weighs the relative contribution of the collected and instantaneous values in determining a new collected value.

DETAILED DESCRIPTION OF THE INVENTION

Figure 1:
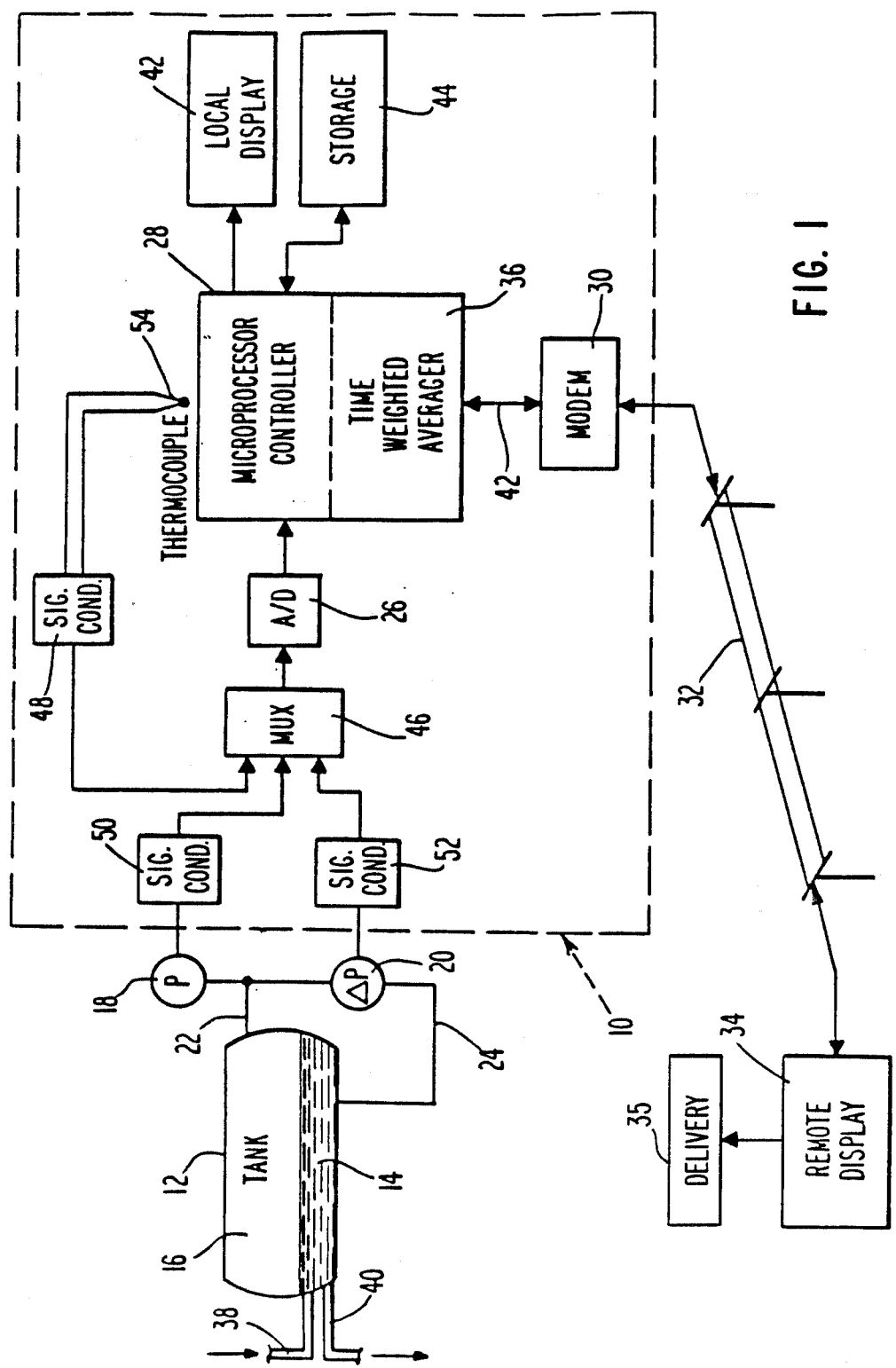
FIG. 1 is a block diagram of system 10 for measuring liquid level in a tank of the present invention.

FIG. 1 shows a block diagram of microprocessor based intelligent user tank telemetry system 10. Tank telemetry system 10 continuously monitors the substance level of a tank 12 containing a cryogenic liquid, having an inlet 38 and an outlet 40 and at a user location containing substance space 14 and vapor space 16. Pressure sense line 22 couples vapor space 16 to pressure transducer 18 and to differential pressure transducer 20. Pressure sense line 24 couples substance space 14 to differential pressure gauge 20. System 10 includes three signal conditioners 48, 50 and 52. The outputs of signal conditioners 48, 50 and 52 are multiplexed by multiplexer 46 and the single output of multiplexer 46 is applied to A/D converter 26. Microprocessor controller 28 has conventional volatile and non-volatile memory and a time-weighted software-based averager 36 which smooths out erratic substance level determinations. Automatic dialing modem 30 is coupled to remote display 34 by telephone lines 32.

Pressure transducer 18 produces an analog signal proportional to the pressure of vapor space 16. Differential pressure transducer 20 produces an analog signal proportional to the difference between the pressure of vapor space 16 and the pressure at the bottom of substance space 14. The analog output signals of transducers 18 and 20 are conditioned by signal conditioners 50 and 52 respectively. The conditioned signals are multiplexed by multiplexer 46 and applied to A/D converter 26.

A/D converter 26 converts the multiplexed analog output signals to digital signals and applies these digital signals to microprocessor controller 28. Based upon the signal generated by differential pressure transducer 20 and received from A/D converter 26, microcontroller 28 periodically determines an instantaneous level of substance in substance space 14. This determination requires only a multiplication of the differential pressure signal by a predetermined constant. A typical value for this constant is 27.67. From these instantaneous values of substance level time-weighted averager 36 determines a collected average level. Controller 28 stores the collected average level and recognizes collected average substance levels below a predetermined threshold set point.

System 10 is applicable to any liquid storage tank 12 but time-weighted averager 36 within controller 28 is particularly useful when the substance within tank 12 is a cryogenic substance because of complications inherent in the storage of cryogenic liquids. Thus, time-weighted averager 36 is provided within controller 28. When a cryogenic substance is supplied to tank 12 through inlet 38, or drawn from tank 12 through outlet 40, unpredictable erratic fluctuations in the vapor space pressure of vapor space 16 can be produced. This results in fluctuations in the outputs of differential pressure transducer 20. The turbulence which results in differential pressure fluctuation is caused by such factors as the pumps used to move the substance, the temperature differential of the substance being supplied to the tank and that in the tank, and the requirement that a new equilibrium between vapor space 16 and substance space 14 be established.

These problems may occur only periodically during occasional replenishing and drawing of substance in some applications or they may occur on a continuous basis in applications were substance is continuously drawn from tank 12. These erratic fluctuations in differential pressure cause controller 28 to produce erratic instantaneous substance level calculations. The erratic calculated values of substance level could result in false calls by modem 38 to remote display 34 unless the level calculations are smoothed by time-weighted averager 36.

The appendices 1 and 2, which appear at the end of the specification in the parent U.S. Pat. No. 4,602,344, are incorporated in the instant application by reference in the specification.

System 10 may perform all the described operations upon more than one tank 12 concurrently by having controller 28 monitor the pressure for each tank 12 on separate channels (not shown) as set forth in routine INDATA on page 10 of Appendix 2. If more than one tank 12 is monitored by system 10, the particular tank 12 being reported on is identified by its tank number when remote display 34 is called as set forth in routine TEMP on page 7 in Appendix 2.

Figure 2:
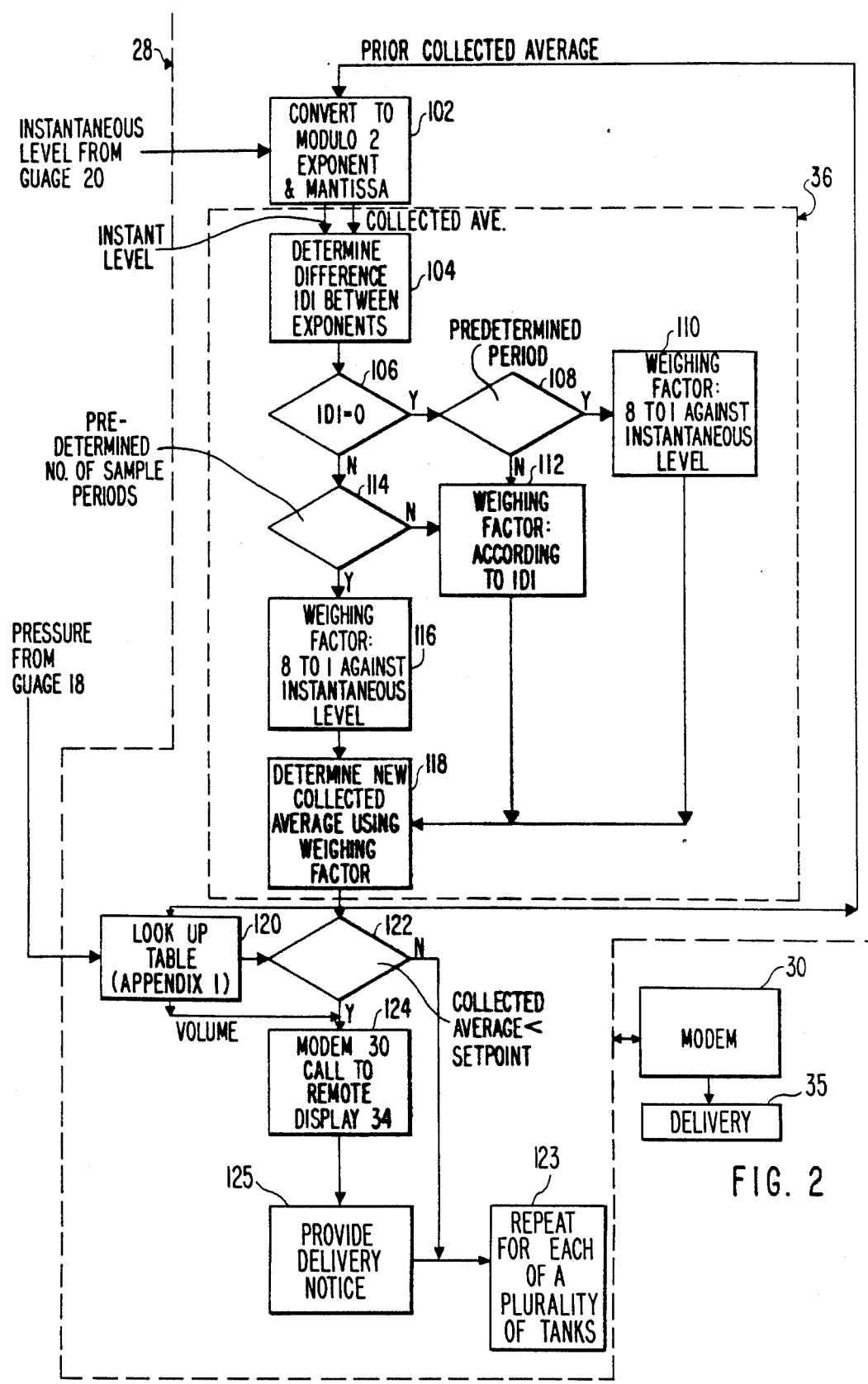
FIG. 2 is a flow diagram of portions of system 10 of FIG. 1.

Referring now to FIG. 2, there is shown a flow diagram of portions of some of the functions of controller 28 and averager 36. Microprocessor controller 28 applies two values to time-weighted averager 36, (1) the instantaneous tank level signal, as determined from the most recent value of differential pressure applied to microcontroller 28, and (2) the prior collected average level stored within the memory of controller 28. The prior collected average is the current level of substance within tank 12 as of the most recent update. The instantaneous tank level is the most recent level calculated and may be based upon quiescent differential pressures or upon sample values of erratically fluctuating differential pressures. The signal conditioning and multiplexing of the signals from transducers 18, 20 have been omitted from FIG. 2 to simplify the drawing.

The instantaneous value of tank level supplied to time-weighted averager 36 is converted into a modulo two mantissa and exponent at block 102 of controller 28 before being supplied to time-weighted averager 36. It is converted into a modulo two mantissa and exponent in the following way. The instantaneous level determined from the vapor space pressure and the differential pressure is repeatedly divided by two until a mantissa between 0 and 0.5 is produced. The number of divisions required to produce such a mantissa is counted and stored in base two form as the exponent. The collected average is processed into a modulo two mantissa and exponent in the same manner before being passed to time-weighted averager 36.

Time-weighted averager 36 then compares the exponent of the new instantaneous level with the exponent of the collected average which it received from controller 28. If a change in the exponent is detected at decision 106, a weighting factor is developed in order to weigh the collected average more heavily than the new instantaneous value. The weighting factor is determined in block 112 by calculating or determining at block 104 the difference D between the exponent of the collected average value and the exponent of the instantaneous value as determined in block 102 and taking the absolute value of this difference. Each difference of one between the exponents thus results in another factor of two in the relative weighing. Thus, there is an increasing rejection of deviant values because of the base 2 exponential arithmetic in the determination of the weighing factor.

If a difference between the exponent of the collected average and the exponent of the instantaneous level value persists for a predetermined number of sample periods as determined at decision 114 a weighing factor of 8 to 1 against the instantaneous level is for determined for one sample period at block 116. A sample period is the time between readings of the signal from transducer 20 and is approximately one minute. One instantaneous value of substance level and one value of collected average level are determined for each such sample period.

The predetermined number of sample periods during which the difference between the instantaneous exponent and the collected exponent must persist before time-weighted averager 36 switches to the 8 to 1 weighing factor for one period varies depending on the size and shape of tank 12 and this number of sample periods is represented as N. It is normally two or three periods. Following this one period with an 8 to 1 weighting factor, time-weighted averager 36 returns to using a weighting factor which is the absolute value of the difference between the exponents as described for block 112. If a difference between the instantaneous exponent and the collected average exponent again persists for N sample periods, the 8 to 1 weighing factor of block 116 is again determined.

If the exponent of the collected averages and the exponent of the instantaneous values remain equal for a predetermined period of time as determined at decision 108 (usually 2 to 3 sample periods depending on tank 12), the average is weighted 8 to 1 against the instantaneous value at block 110. Thus time-weighted averager 36 is a three tiered time-weighted averager.

There is a first weighting tier which is used when the exponent of the new instantaneous value remains the same as the exponent of the collected average for a predetermined period of time (block 110), a second weighting tier which is used when there is a variation between the collected average exponent and the instantaneous value exponent (block 112), and a third weighting tier which is used when the variation between the collected value exponent and the instantaneous value exponent persists longer than a predetermined period of time (block 116). Regardless of which of the possible instantaneous values are averaged with appropriate weighting factor, the resulting averaged value becomes the new collected average at block 118. The next time that time weighted averager 36 performs its calculations, this new collected average will be used as the prior collected average in block 102.

Controller 28 is coupled to modem 30 by bi-directional line 42. Controller 28 compares the collected average against a predetermined set point value stored in its memory decision 122. When controller 28 determines that the collected average of the level of substance in tank 12 has fallen below the predetermined low level set point, controller 28 causes automatic dialing modem 30 to dial the remote display 34 over telephone lines 32 as described in block 124, thereby giving notice that a delivery of substance is required and providing a notice to deliver further substance as shown in block 125. System 10 may then provide delivery 35 by way of remote display 34. These operations may then be repeated for each of a plurality of tanks as shown in block 123. This could result in false calls to remote display 34 because of the erratic fluctuations which occur during drawing and replenishing of tank 12 if not for time-weighted averager 36.

The comparison of the collected average with the set point is set forth in the CHKSET routine on page 9 of Appendix 2. CHKSET is called by the MAIN routine on page 1 of Appendix 2. Two different predetermined threshold setpoints are compared with the collected average in CHKSET: a higher set point which gives a warning that tank 12 is approaching the level at which a refill is requested and a lower set point which actually triggers the request. Remote location 34 is accessed by controller 28 through modem 30 when either of these set points is reached as set forth in the CHKSET routine. During these accesses of remote location 34 the date and time of the set point crossing is also transmitted as set forth on page 30 of Appendix 2.

Additionally, controller 28 may be programmed to determine the rate at which tank 12 is being depleted based upon determination of values of level over a period of time between reaching the two set points. This determination is made by the RATCAL routine on page 29 of Appendix 2 in which the difference between the two levels which cross the respective high and low threshold set points is determined. This difference is divided by the time between reaching the two set points to determine the flow rate. The rate of usage thus determined is transmitted to remote location 34 when the occurrence of reaching the lower threshold set point is transmitted to location 34.

Controller 28 as an alternate embodiment may be programmed to periodically dial remote display 34 and transmit information regarding the current level of substance in tank 12 regardless of what the level may be and to re-dial remote display 34 if a call is not answered. Operators at remote display 34 may also use telephone lines 32 and modem 30 to interrogate controller 28 to determine the level of substance in tank 12 at any time.

The values transmitted to remote display 34 by controller 28 may include the substance level, time, an I.D.

code identifying the controller, pressure, and, if a set point alarm has been given, the time of the alarm. Controller 28 may also transmit the maximum and minimum pressure readings of tank 12. As set forth on page 43 of Appendix 2 the determination of the maximum and minimum pressure in a tank is verified each time a new pressure is calculated. The transmission of data to modem 30 for transmission to remote display 34 is set forth on pages 3 and 5 of Appendix 2. Additionally the date and time of a set point crossing may be stored in memory as set forth on page 30 of Appendix 2 and transmitted to remote display 34.

Pressure transducers 18 and 20 are piezoelectric devices which have an analog output range of 2 to 12.5 volts direct current (DC). The analog outputs of transducers 18 and 20 are conditioned by signal conditioners 50 and 52. Signal conditioners 50 and 52 convert the 2.5 to 12.5 volt output ranges of pressure transducers 18 and 20 to 0 to 5 volt ranges for multiplexer 46 and provides fuses for transducers 18 and 20 at approximately 20 ma. From multiplexer 46 the signals are converted to digital signals by A/D converter 26 and applied to controller 28 which can determine whether A/D converter 26 is out of order in routine ANALIN as set forth on page 22 of Appendix 2 and notify remote display 34 that A/D converter 26 is out of order as set forth on page 5.

Additionally, there may be a temperature transducer such as thermocouple 54 to monitor the temperature of tank telemetry system 10 itself. However the temperature value is not necessary for determining the level of substance in tank 12. The signal from thermocouple 54 is conditioned by signal conditioner 48 which includes amplification and ice junction compensation for providing a reference temperature for thermocouple 54. The signal from signal conditioner 48 is applied to multiplexer 46 and multiplexed with the signals from signal conditioners 50 and 52. A/D converter 26 applies all multiplexed signals to controller 28.

Controller 28 is programmed to determine the volume of substance within tank 12. To make this determination two parameters are required. The first parameter is the collected average level determined by time-weighted averager 36 and stored in the memory of controller 28. The other parameter required is the pressure within vapor space 16 of tank 12. The pressure within vapor space 16 is coupled by sense line 22 to pressure transducer 18. Pressure transducer 18 produces an analog signal proportional to the pressure within vapor space 16. The analog output of transducer 18 is conditioned by signal conditioner 50, multiplexed by multiplexer 46, and applied to A/D converter 26. Thus, the signal from pressure transducer 18 is applied to microprocessor controller 28 by A/D converter 26, thereby providing controller 28 with the other parameter required to determine the volume of substance space 14.

The relationship between these two parameters, the collected average level, the pressure, and the volume of substance space 14 is a complex high order polynomial. As an alternate embodiment microprocessor 28 may be programmed to solve this polynomial. Alternately a table look up may be performed as shown at block 120. An example of a cryogenic liquid contents chart which may be used for such a table look up appears at the end of the specification of said parent U.S. Pat. No. 4,602,344 as Appendix 1. The table of Appendix 1 contains the solution value of this polynomial for a plurality of pressure and substance level readings and avoids the time delay required to solve the polynomial in real time while system 10 is in operation.

In this look up table, collected average level appears on the vertical axis and pressure appears on the horizontal axis. By choosing a row depending on the average level and a column depending on the pressure a table entry may be selected. This table entry is the volume of substance space 14. Furthermore, controller 28 may be programmed to compare this value of volume against a predetermined volume setpoint and initiate a call to remote display 34 in response thereto as described for the level setpoint comparison, thereby requesting a refill of tank 12.

Additionally, a local display 42 and local non-volatile storage 44 may be provided. Display 42 and storage 44 allow system 10 to display and/or store all values transmitted by controller 28 to remote display 34, such as pressure, differential pressure, temperature (if a thermocouple is provided), and collected average substance level. Non-volatile storage 44 may be tape or floppy disks, but preferably is low power, semiconductor memory with a back-up power source. The assembly language listing for the program of controller 28 appears at the end of the specification of said parent U.S. Pat. No. 4,602,344 as Appendix 2.

In system 10 the following components have been used for the operation and function as described and shown.

| Reference Numeral | Type |
| --- | --- |
| 18 | Sensym LX 1830 |
| 20 | Sensym LX 1801 |
| 26 | Intersil 7109 |
| 28 | Intel MCS51 Family |
| 46 | AD 7507 |
| 48 | AD 594 |
| 50,52 | LM 324 |
| 54 | Type J |
| 30 | Micro-Baud Systems Inc. 001-00-80515 |

Although the invention has been particularly shown and described with reference to a preferred embodiment thereof, it will be understood by those skilled in the art that various changes may be made therein without departing from the spirit or scope of the invention.

We claim:

1. A method for determining when to deliver further substance from a remote location to a tank containing substance at a user location in accordance with the level of substance in the tank comprising the steps of:
    (a) comparing a first substance level with a first predetermined set point to determine a first time when the level falls below the first set point;
    (b) comparing a second substance level with a second predetermined set point to determine a second time when the level falls below the second predetermined threshold;
(c) determining the rate of substance usage between the first and second times;
(d) transmitting the rate to the remote location in response to the occurrence of the second determination; and
(e) dispatching to the user location a vehicle containing the further substance in response to the transmission.

2. The method of claim 1 in which steps (a) and (b) include determining the substance level using a time weighted averager.

3. The method of claim 1 in which step (c) includes:
determining the level difference between the first and second substance levels;
determining the time difference between the first and second times; and
dividing the level difference by the time difference.

4. The method of claim 1 in which step (d) includes transmitting through a modem and telephone lines.

5. A method for measuring the level of substance in a tank in which the level is subject to changes and updating a prior collected average level of the substance comprising the steps of:
(a) continuously determining values of differential pressure from within the tank;
(b) determining the instantaneous level of substance within the tank in response to the determined values of differential pressure;
(c) determining a difference relationship between the prior collected average level and the instantaneous level;
(d) determining a relative weighting factor for the prior collected average level and the instantaneous level which weighting factor varies in accordance with the difference relationship;
(e) determining a new collected average in response to the relative weighting factor;
(f) determining the rate of substance depletion in response to the new collected average; and
(g) repeating steps (b) through (f) in which the new collected average becomes the prior collected average in step (c).

6. A method for determining when to deliver further substance from a remote location to a tank containing substance at a user location in accordance with the level of substance in the tank in which the level is subject to changes comprising the steps of:
(a) continuously determining values of differential pressure from within the tank;
(b) determining the instantaneous level of substance within the tank in response to the determined values of differential pressure;
(c) determining a difference relationship between the prior collected average level and the instantaneous level;
(d) determining a relative weighting factor for the prior collected average level and the instantaneous level which weighting factor varies in accordance with the difference relationship;
(e) determining a new collected average in response to the relative weighting factor;
(f) comparing the new collected average with a first predetermined set point and transmitting a first signal to the remote location when the new collected average is below the first predetermined set point;
(g) comparing the new collected average with a second predetermined set point and transmitting a second signal to the remote location when the new collected average is below the second predetermined set point; and
(h) dispatching to the user location a vehicle containing the further substance in response to a transmission; and
(i) repeating steps (b) through (g) in which the new collected average becomes the prior collected average in step (c).

7. A method for measuring the level of substance in a tank in which the level is subject to changes and updating a prior collected average level of the substance comprising the steps of:
(a) continuously determining values of differential pressure from within the tank;
(b) determining the instantaneous level of substance within the tank in response to the determined values of differential pressure;
(c) determining a difference relationship between the prior collected average level and the instantaneous level;
(d) determining a relative weighting factor for the prior collected average level and the instantaneous level which weighting factor varies in accordance with the difference relationship;
(e) determining a new collected average in response to the relative weighting factor;
(f) determining maximum and minimum pressures within the tank and providing a signal to a remote display representative of the maximum and minimum pressures; and
(g) repeating steps (b) through (f) in which the new collected average becomes the prior collected average in step (c).

8. A method for measuring the level of substance in a tank in which the level is subject to changes and updating a prior collected average level of the substance comprising the steps of:
(a) continuously determining values of differential pressure from within the tank;
(b) determining the instantaneous level of substance within the tank in response to the determined values of differential pressure;
(c) determining a difference relationship between the prior collected average level and the instantaneous level;
(d) determining a relative weighting factor for the prior collected average level and the instantaneous level which weighting factor varies in accordance with the difference relationship;
(e) determining a new collected average in response to the relative weighting factor;
(f) comparing the new collected average with a predetermined setpoint and providing a signal when the new collected averge is below the setpoint;
(g) telecommunicating with placing a phone call to a remote station in response to the signal and periodically repeating the phone call until the phone call is answered; and
(h) repeating steps (b) through (g) in which the new collected average becomes the prior collected average in step (c).

9. A method for measuring the level of substance in a tank in which the level is subject to changes and updating a prior collected average level of the substance comprising the steps of:
   (a) continuously determining values of differential pressure from within the tank including analog to digital converting of a differential pressure signal;
   (b) determining whether the converting is operating and providing a signal to a remote display in response to the converting determination;
   (c) determining the instantaneous level of substance within the tank in response to the converted values of differential pressure;
   (d) determining a difference relationship between the prior collected average level and the instantaneous level;
   (e) determining a relative weighting factor for the prior collected average level and the instantaneous level which weighting factor varies in accordance with the difference relationship;
   (f) determining a new collected average in response to the relative weighting factor; and
   (g) repeating steps (b) through (f) in which the new collected average becomes the prior collected average in step (d).

10. A method for measuring the level of substance in each tank of a plurality of tanks in which the level is subject to changes and updating a prior collected average level of substance in each tank comprising the steps of:
   (a) continuously determining values of differential pressure from within each tank;
   (b) determining the instantaneous level of substance within each tank in response to the determined values of differential pressure;
   (c) determining a difference relationship between the prior collected average level and the instantaneous level of each tank;
   (d) determining a relative weighting factor for the prior collected average level and the instantaneous level for each tank which weighting factor varies in accordance with the difference relationship of each tank;
   (e) determining a new collected average for each tank in response to the relative weighting factor of each tank; and
   (f) repeating steps (b) through (e) in which the new collected average becomes the prior collected average in step (c).

* * * * *